(12) United States Patent
Kombowski

(10) Patent No.: US 8,359,850 B2
(45) Date of Patent: Jan. 29, 2013

(54) HYDRODYNAMIC COMPONENT AND FORCE TRANSMISSION DEVICE WITH A HYDRODYNAMIC COMPONENT

(75) Inventor: Eugen Kombowski, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 932 days.

(21) Appl. No.: 12/464,410

(22) Filed: May 12, 2009

(65) Prior Publication Data

US 2009/0282821 A1 Nov. 19, 2009

(30) Foreign Application Priority Data

May 13, 2008 (DE) .................. 10 2008 023 342

(51) Int. Cl.
*F16H 41/26* (2006.01)
*F16H 45/02* (2006.01)

(52) U.S. Cl. ........................... 60/364; 60/330

(58) Field of Classification Search ............. 60/330, 60/364, 365; 416/197 C
See application file for complete search history.

(56) References Cited

U.S. PATENT DOCUMENTS

| 2,428,134 | A | * | 9/1947 | Zeidler | 60/330 |
| 2,429,503 | A | * | 10/1947 | Zeidler | 416/197 C |
| 6,631,795 | B2 | * | 10/2003 | Inoue et al. | 60/365 |
| 7,350,352 | B2 | * | 4/2008 | Iwao et al. | 60/330 |

* cited by examiner

*Primary Examiner* — Thomas E Lazo
(74) *Attorney, Agent, or Firm* — Simpson & Simpson, PLLC

(57) ABSTRACT

The invention relates to a hydrodynamic component, comprising at least two bladed shells forming a torus shaped operating cavity in combination, each comprising a blade array supported by a dish, wherein at least one of the bladed shells comprises no support of the blades through the dish in the radially inner end portion of the particular blades. The invention is characterized in that flow control means are provided in the radially inner end portion of the torus shaped operating cavity in the portion where the dish is missing. The invention furthermore relates to a force transmission device with a hydrodynamic component.

6 Claims, 4 Drawing Sheets

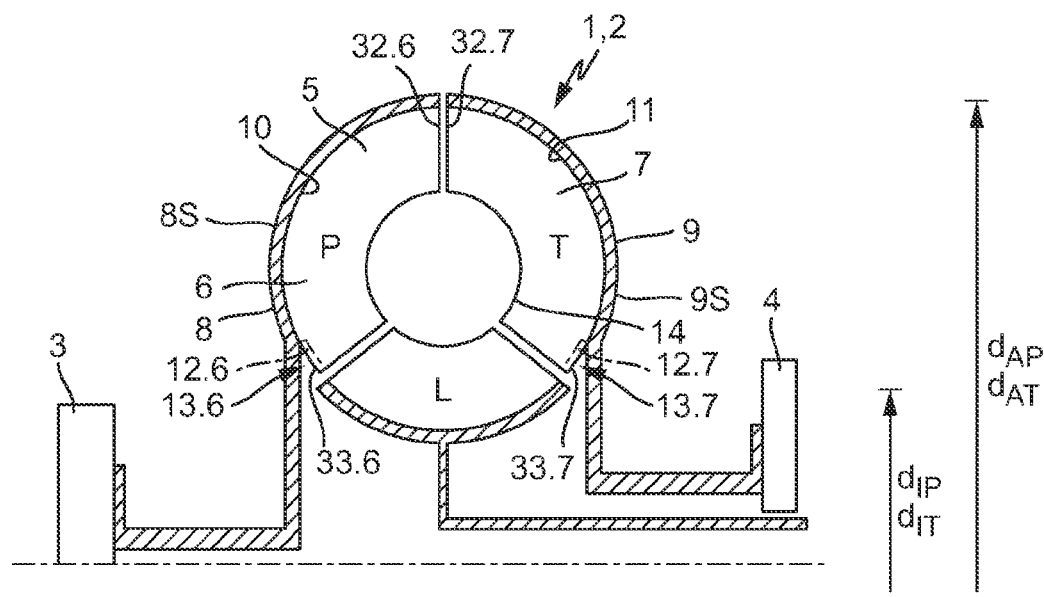
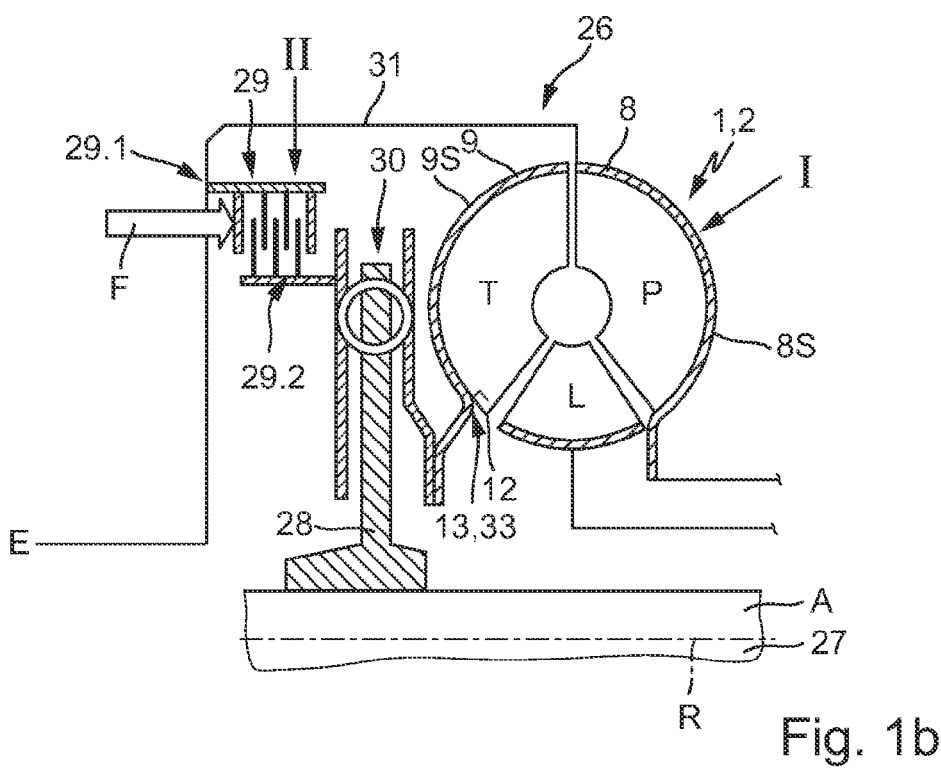
Fig. 1a
Fig. 1b

HYDRODYNAMIC COMPONENT AND FORCE TRANSMISSION DEVICE WITH A HYDRODYNAMIC COMPONENT

CROSS-REFERENCE TO RELATED APPLICATIONS

The present application claims priority from German Patent Application No. 10 2008 023 342.0, filed on May 13, 2008 which application is incorporated herein by reference.

FIELD OF THE INVENTION

The invention relates to a hydrodynamic component, comprising at least two bladed shells forming a torus shaped operating cavity in combination, which bladed shells respectively comprise a dish which supports the particular blades over a particular portion, wherein at least one of the bladed shells does not comprise a support of the blades by the dish in the radially inner end portion of the particular blades.

The invention furthermore relates to a force transmission device for power transmission between an output side component and an input side component, comprising an input and an output and a hydrodynamic component disposed there between.

BACKGROUND OF THE INVENTION

Hydrodynamic components are known in various configurations for a plurality of applications. They are often used in power transmission devices in the form of combined units for accelerating from a stop and for lockup in motor vehicles or in stationary systems. The hydrodynamic component can thus be configured as hydrodynamic speed-/torque converter, comprising a first bladed shell operating as a pump shell, when coupled with the input of the force transmission device, and a second bladed shell operating as a turbine shell and coupled to the output, and at least one stator shell disposed there between. A speed conversion thus always simultaneously causes a torque conversion. On the other hand, also embodiments are known which only comprise a hydrodynamic component with a pump shell and a turbine shell, which components are provided as a hydrodynamic clutches, and which are thus suitable only for speed conversion. The particular bladed shells are characterized by a blade array, which comprises blades disposed in an annular shell, extending in radial direction with at least one directional component. The shell geometry is configured, so that it supports, on the one hand, the blades when forming the torus shaped operating cavity and furthermore, so that it also facilitates a connection to connection elements, in particular to the transmission output shaft. In particular, when the shells are configured as formed sheet metal components, they are often characterized by a highly dished shape, which leads to a strong contraction of the shell in the portion of the inner diameter of the shell, which leads to a substantial weakening on said portion, which in turn is essential for force transmission, since the force transmission is performed through said portion. A substantial problem often is that the transition between the turbine shell and the output hub is to be configured accordingly, in order to connect the output hub with the transmission input shaft, which causes the turbine shell to be shaped accordingly. The blade bearing portion is thus shortened in radial direction to a relatively high extent towards the inside, since the turbine shell does not follow the torus shape in this portion anymore, but it is configured as straight as possible or with a particular shape for connecting to the output shaft. Through this configuration, relatively large gaps are generated at the transition between the stator shell and the turbine shell. However, when the blades are extended in the direction towards the stator shell as far as possible and the gaps are thus kept as small as possible, there is no support at all of the flow routing in the operating cavity in the radially inner portion of the torus shaped operating cavity, since the blade ends in radially inward direction comprise no support and facilitate a flow transition. Thus, in particular during hydrodynamic power transmission, strong stalls are generated between the pump shell and the turbine shell over the stator shell, which stalls are undesirable for operations and can lead to instable situations. These have to be compensated in turn with other measures, which lead to an increased design complexity and possibly also lead to control complexity.

BRIEF SUMMARY OF THE INVENTION

Thus, it is the object of the invention to improve a hydrodynamic component of the type recited supra, in particular for use in force transmission devices, so that said disadvantages are avoided and a discretionary connection configuration for the respective bladed shell, in particular for the turbine shell, becomes possible.

The hydrodynamic component according to the invention, comprising at least two bladed shells forming a torus shaped operating cavity in combination, which bladed shells respectively comprise a dish, which supports the particular blades over a portion, wherein at least one of the bladed shells does not comprise a support of the blades through the dish in the radially inner end portion of the particular blades, wherein flow control means are associated with said radially inner end portion of the particular blades, which end portion is not supported by the dish.

An operating cavity in the sense of the invention is thus the cavity, which is characterized by the blade geometry of the particular blade arrays, in particular characterized by their outer circumference with reference to the torus formed by the blade array. Thus, the torus viewed in radial direction can be described by an inner diameter and by an outer diameter. The inner diameter corresponds to the blade ends oriented radially inward towards the axis of rotation, viewed with the blade array in installed position, while the outer circumference can be described by the blade ends disposed on the radial outside.

The radially inner end portion of the particular blades corresponds to the portion of the particular blades disposed in the radially inner portion of the operating cavity. The side of the blade oriented towards the operating cavity is designated as blade top, and the side of the blade supported at the shell is designated blade base or lower side of the blade. The sides of the blades oriented in circumferential direction form blade front sides and blade back sides, depending on the direction of flow.

The association according to the invention of flow control means in the radially inner portion of the torus shaped operating cavity adapted to the blade geometry in the portion of the blade array not supported by the respective shell has the advantage that irrespective of the geometric configuration of a dish associated with the blade array, in particular for implementing a joining or connection portion with connection elements in flow direction in the radially inner portion, a directed flow can be maintained due to the guidance by the means in the operating cavity. Thus, in particular, any geometry can be selected for the shell, in particular in the connection portion.

The flow control means according to the invention can be implemented in various ways. Said means, however, are formed and disposed, so that they are configured to provide flow control in the portion of the blade array not supported by the dish, in particular in the radially inner portion of the torus shaped operating cavity, wherein the control is preferably performed adapted to the geometry of the particular blades.

In a first particularly advantageous embodiment, the means are thus formed by the guide elements integrally configured with the particular blades, which guide elements viewed in circumferential direction reconstitute the geometry of the missing dish portion. This is preferably implemented in that the particular blade comprises an additional surface based guide portion during fabrication in the blade portion, which is on the radial inside in installed position, which guide portion is disposed at an angle relative to the front side of the blade or to the backside of the blade, and formed and configured viewed in circumferential direction, so that it makes up for the missing dish portion. The configuration of the guide element, which is preferably surface based, is thus preferably performed, so that it is adapted and connected in the radially inner portion of the torus shaped operating cavity and so that it is oriented in circumferential direction. The surface oriented towards the operating cavity is planar and adapted to the extension of the blades. This is considered, when forming the particular blades, in particular when the blades are configured as formed sheet metal components.

According to a particularly preferred embodiment, the surface based guide element, which reconstitutes the missing radially inner portion of the dish, viewed in radial direction, is preferably disposed at the front side of the blade viewed in flow direction, and extends viewed in circumferential direction in the direction of the backside of the adjacent blade element oriented in flow direction, which prevents stalls when the flow enters the respective blade.

The integral configuration of the flow control means with the particular blades has the advantage that no additional connections, in particular torque proof connections, have to be provided between said means and the actual dish for the respective bladed shell, but said means are also fixated in position through the integration of the blades into the respective shell, in particular when they are configured as formed sheet metal components, through the bonding, friction locking or form locking when the blades are coupled to the shell.

According to an alternative embodiment of the solution according to the invention, it is also possible that the means comprise separate, in particular annular elements, or elements formed into a ring or elements formed from ring segments, which are either connected torque proof to the respective bladed shell in the blade end portion, or connected to an adjacent bladed shell. According to a first alternative embodiment, the means comprise an annular sheet metal element configured in circumferential direction, which is configured with an outer circumference, so that it recreates the contour of the freely protruding blade portion, and thus, so that the annular element is configured to recreate the missing shell geometry in this portion. The outer circumference of the annular element thus preferably corresponds directly to the surface defined by the outer circumferences of the blade ends in the non-supported portion and is free of interruptions.

The flow guide surface defined by the outer circumference of the annular element is thus preferably configured and disposed, so that it is suitable, on the one hand, to form the missing inner dish surface in the protruding portion of the free blade ends, and furthermore, to establish a physical contact with the blades in said portion. Thus, the annular element further takes over a support function for the blade array of the respective bladed shell in the respective blade end portion.

The annular element can be configured with respect to its sizing, so that a press fit is accomplished with the blade array.

The annular element as a separate element is connected torque proof to the shell of the respective bladed shell. According to a first particularly advantageous embodiment, the connection is permanent. Thus, preferably bonded connections are selected. In a second embodiment, however, it is also conceivable to use disengageable connections. In this case, the flow guide surface, which can be defined by the contour of the outer surface of the annular element, can be configured variably adjustable, in particular adjustable.

In a second alternative embodiment, it is implemented to provide the shell geometry, which is to be recreated in the overhanging portion of the particular blades through flow control means provided in the form of at least one guide element, which, however, is connected torque proof with another bladed shell, in particular connected to the adjacent bladed shell of a hydrodynamic component. In this case, the disposition is performed offset from the surface portions, which can be defined by the free blade ends and which are oriented in radial direction. The guide element also defines a guide surface, which is continuous in circumferential direction and which is adapted to the contour of the free portion of the blades in axial direction.

The solution according to the invention is used in particular in embodiments of hydrodynamic speed-/torque converters for pump shells or for turbine shells. A particularly advantageous embodiment, thus, is comprised of integrating said components into the hydrodynamic components of force transmission devices. In these embodiments, in particular when configuring the turbine shell, the blade array of the turbine shell in the radially inner portion of the torus shaped operating cavity is configured, so that it is supported by flow control means in a pot shaped configuration of the dish.

BRIEF DESCRIPTION OF THE SEVERAL VIEWS OF THE DRAWINGS

The solution according to the invention is subsequently illustrated with reference to figures, wherein:

FIG. 1a illustrates a simplified schematic of the basic principle of the solution according to the invention with reference to an axial sectional view;

FIG. 1b illustrates an integration of a hydrodynamic component according to the invention in a force transmission device;

DETAILED DESCRIPTION OF THE INVENTION

Figure 2A:
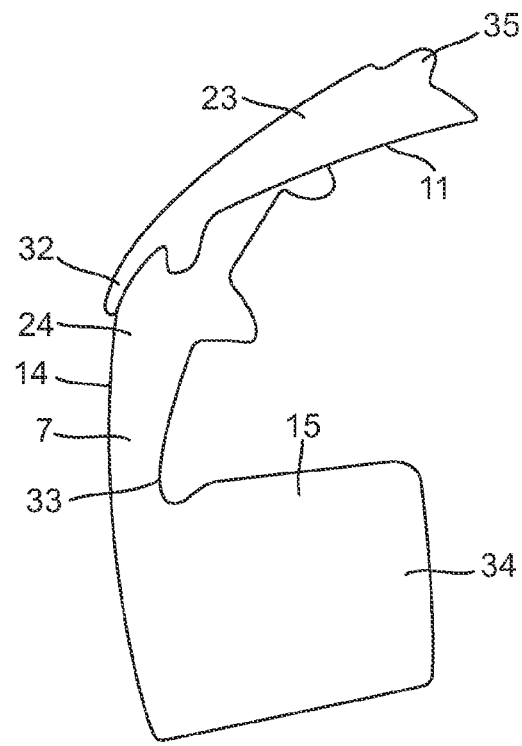
FIGS. 2a and 2b illustrate a first particularly advantageous embodiment of the flow control means in the radially inner portion of the torus shaped operating cavity integrally configured with the blade array.

FIG. 1a illustrates a simplified schematic view of a hydrodynamic component 1 according to the invention, preferably provided as a hydrodynamic speed-/torque converter, in axial view. It comprises a pump shell P and a turbine shell T and furthermore, as a hydrodynamic speed-/torque converter, it comprises at least one stator shell L. The hydrodynamic speed-/torque converter 2 thus operates as a hydrodynamic transmission. Converting torque also always causes a speed conversion. The particular bladed shells, pump shell P, turbine shell T and stator shell form an operating cavity 5, which can be filled with operating means. Thus, the pump shell P, when used for power transmission in drive trains, is disposed in the force flow, viewed from the input to the output, between an input side component 4 and an output side component 3, and coupled to the output side component 3, while the turbine shell T is coupled to the input side component 4. The bladed shells, in particular the pump shell P and the turbine shell T respectively comprise a blade array. Each blade array comprises a plurality of blades disposed in circumferential direction about a rotation axis R, which also corresponds to the center axis of the hydrodynamic speed-/torque converter 2, which blades support said blade array. The blades are thus designates as 6 for the pump shell P and designated as 7 for the turbine shell T. The particular blades 6 and 7 are each disposed in a dish, in particular in the pump shell dish 8 and the turbine shell dish 9. The blade array of a bladed shell and the associated dish, in particular the pump shell dish 8 and the turbine shell dish 9, can be configured as integral units, e.g. when configured as cast components, or they can be formed by separate elements, which are connected with one another through form locking, friction locking and/or bonding. Through the respective dishes, pump shell dish 8 and turbine shell dish 9, a connection is performed to the output side or to the input side components 3, 4, therefore the shell geometry of the particular shells, in particular of the pump shell P, or of the turbine shell T, is to be adjusted to said requirements. The portion of the particular bladed shells P, T describing the torus shaped operating cavity 5 is characterized by the bladed portion 8S of the pump shell 8 or 9S of the turbine dish 9. These are respectively characterized by an outer diameter $d_{AP}$, $d_{AT}$ and an inner diameter $d_{IP}$, $d_{IT}$ in the illustrated axial sectional plane, which can be described by the rotation axis R and by a perpendicular thereto. The dish shape of the pump shell dish 8 or of the turbine shell dish 9 thus follows the shape of the blades.

FIG. 1a illustrates a view of a blade 7 of the turbine shell T and of a blade 6 of the pump shell P and of the turbine shell dish 9 and of the pump shell dish 8 with reference to an axial sectional view. Thus, it is evident that in particular with respect to couplings with the input side components 4, which are implemented through the turbine shell T, the turbine shell dish 9 in the portion of the inner diameter $d_{IT}$ of the blade array co-defining the configuration of the torus shaped operating cavity has to be configured to define connection portions/joint portions for coupling with the connection elements. Thus, it is problematic to have the shell geometry extend viewed in axial direction in the radially inner portion according to the shape predetermined through the geometry of the blades 6, 7 in the blade base 10 for the pump shell P and 11 and for the turbine shell T. Depending on the embodiment, this would lead to a highly dished configuration, which is exposed to very high stress in particular in the portion of the radially inner diameter, and thus is damage prone. Thus, the bases 10, 11 of the blades are the sides or the surfaces of the particular blades 6, 7, which come into contact with the respective blade at the inner circumference of the respective dish. Thus, a portion 13.6, 13.7 remains in the radially inward disposed portion of at least one of the bladed shells 5, 7, here in an exemplary manner of the two bladed shells P, T, in the portion of the inner diameter $d_{IT}$ or $d_{IP}$, in which portion 13.6, 13.7 the respective blade 6, 7 is not supported by the pump shell dish 8 or the turbine shell dish 9. Depending on the configuration of the coupling between the respective bladed shells P, T and the configuration of the connection, also only one of the bladed shells P, T can be configured by such a configuration with blade ends 33.6, 33.7 hanging over in radial direction without any support by the respective dishes 8, 9. When integrated into force transmission devices, this preferably corresponds to the turbine shell T. Thus, the issue is described primarily with respect to the turbine shell T. When a flow cycle is established, said flow cycle is not supported anymore in the radially inner portion of the torus shaped operating cavity 5 and stalls occur. In order to prevent this, means 12 are associated with the particular blades, in particular with the blades 7 of the turbine shell T or with the blades 6 of the pump shell P, herein means 12.7 for controlling the flow cycle in the portion of the inner diameter $d_{IT}$ of the turbine shell T and means 12.6 for controlling the flow cycle in the portion of the inner diameter $d_{IP}$ of the pump shell, wherein the inner diameters $d_{IT}$, $d_{IP}$ correspond to the radially inner configuration diameter of the blades 6, 7. The means 12.6, 12.7 for controlling the flow cycle 12 in this portion are configured and disposed, so that they suitable to control the flow cycle without stalls between the adjacent bladed shells when viewed in cross section of the hydrodynamic component 1. Thus, a substantially torus shaped flow cycle is implemented, which is free from interferences in the portion between the stator shell L and the turbine shell T or between the stator shell L and the pump shell. By providing means 12.6, 12.7, it is possible to configure the geometry of the pump shell dish 8 and/or turbine shell dish 9 completely discretionary, in particular when these are configured as sheet metal components, to adapt these to the overall requirements of the configuration in the portion of the inner diameter, wherein the configuration of the respective dish 8, 9 is provided force- and tension adequate. The means 12.6, 12.7 form the support portion and the portion 13.6, 13.7 of the blade ends 33.6, 33.7 disposed inward in radial direction, which portion is otherwise formed by the respective dish.

FIG. 1b illustrates a particularly advantageous application of a hydrodynamic component 1 with means 12 provided at a bladed shell, in particular at the turbine shell T in radial direction in the inner portion of the blade array, which does not have a direct support through the respective shell, in particular not through the turbine dish 9, which means 12 are provided for flow control in the operating cavity 5 in a force transmission device 26. Said force transmission device comprises at least one input E and one output A. The output A is thus either formed directly by a transmission input shaft 27, or by an element connected torque proof thereto, e.g. a hub 28. Between the input E and the output A, the hydrodynamic component 1 is disposed for configuring a hydrodynamic power path I and a device for circumventing the hydrodynamic power path II in the form of a switchable clutch device 29. The hydrodynamic component 1 and the switchable clutch device 29 are disposed in parallel and can be shifted in parallel; this means they can be shifted separately or together. Thus, the pump shell P is coupled to the input E, in particular to a housing 31 forming said input or connected torque proof to said input, while the turbine shell T is connected through a torsion vibration damper 30 to a hub 28 connected torque proof with the transmission input shaft. The switchable clutch device 29 comprises a first clutch component 29.1, which is at least indirectly, thus, through the housing 31, connected to the input E, and a second clutch component 29.2, which is at least indirectly, in particular through the torsion vibration damper 30, connected to the output A, in particular connected to the transmission input shaft. The first and the second clutch components 29.1, 29.2 can be brought into operative engagement at least indirectly, in particular by generating friction locking.

Thus, the actuatable clutch device 29 comprises a shifting device, through which the required contact pressure force F can be generated as required.

Thus, an installation situation is evident as it occurs, in particular for the coupling between the turbine shell T and the torsion vibration damper 30. Due to the configuration of the turbine shell dish 9 in the connection portion to the device 30, the portion 13 of the blade end 33, which is on the radial inside in installed position remains without support. According to the invention, means 12 for flow control are provided in this portion, which at least partially take over the function of the missing dish portion, preferably they take over said function almost completely.

There are many options with respect to the particular configuration of the means 12.6, 12.7 or 12 for controlling the flow cycle in the radially inner portion of the torus shaped operating cavity 5 at the radially inner blade ends 33, 33.6, 33.7 of the blade array at least at one, preferably at both bladed shells adjacent to the stator shell L, in particular the turbine shell T and the pump shell P.

Figure 2B:
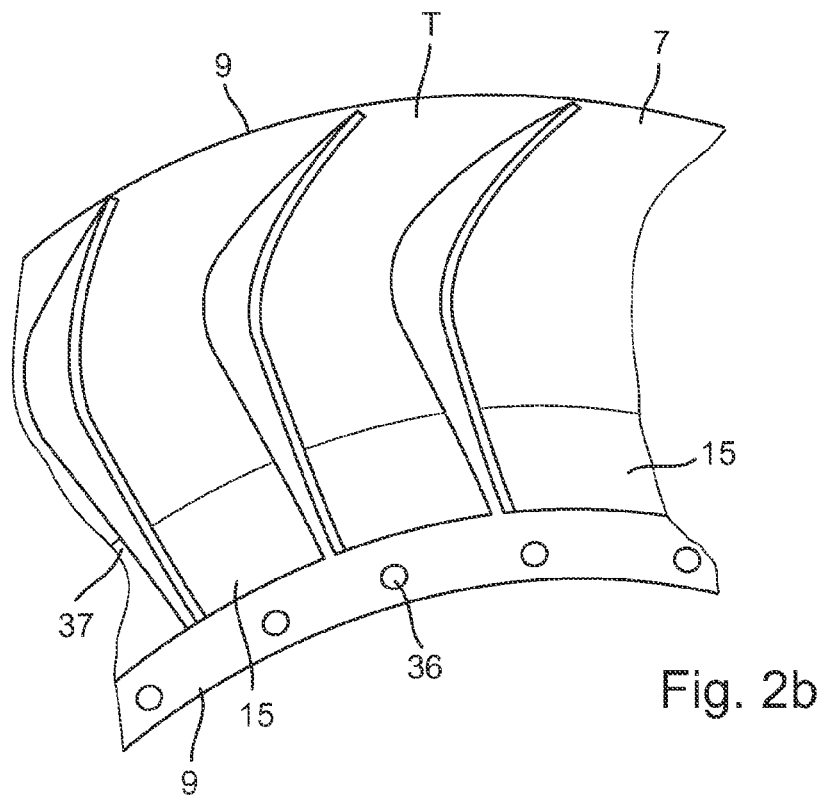

FIGS. 2a and 2b illustrate the configuration of the means 12 in integral construction with the particular blade, here in particular the particular blade 7 of the turbine shell T with reference to a detail of two views, I a simplified schematic illustration. It is self-evident that these statements also apply analogously to the pump shell P when required.

According a first particularly advantageous embodiment, thus the particular blades 7 of a turbine shell T are configured in installed position in the portion of the inner diameter $d_{IT}$, and thus of the radially inner blade end 33, so that said blades replicate a dish shape extending in circumferential direction. The particular blade 7, which is shown in FIG. 2a in an exemplary manner in a top view, is free from a dish supporting said blade, and is thus configured in installed position in the portion of the installed inner diameter $d_{IT}$, or of the radially inner blade end 33, with a guide element 15 configured as a guide plate integrally molded as said blade end 33. The guide element 15 is thus an integral component of the blade 7, wherein the blade 7 can be stamped out of a sheet metal element in the desired geometric shape together with the guide element 15, and the geometry for the installation in the bladed shell, in particular the turbine shell T, is generated through respective sheet metal forming methods. The guide plate 15 is thus disposed at the radially inner diameter of the portion of the torus shaped operating cavity 5, so that said guide plate is oriented in circumferential direction and forms or replicates the lacking geometry of the dish. The integrally formed guide plate forms a surface based support- and guide portion for the flow. Furthermore, means 35 for mounting the blade 7 at the dish, in particular at the turbine shell dish 9, are visible. This is performed in an exemplary manner by form locking.

FIG. 2 illustrates a detail of a winding off of the turbine shell T according to an embodiment according to FIG. 2a. Said winding off illustration shows the following: the geometry of the turbine shell dish 9 reconstituted by the integrally formed guide elements configured as guide plates 15, said dishing 37 of the turbine shell dish 8, and the means 36 required for connecting to the connection elements, here the pass-through openings for the rivets of a rivet joint of the turbine shell dish 9 with a connection element.

The guide elements, in particular the guide plates 15, are integrally formed with the particular blades, here the blade 7, so that they reconstitute the lacking supporting shell portion at least partially in circumferential direction in the portion of the inner diameter $d_{IT}$, which can be described by the respective blade 7 according to the geometry of the operating cavity 5, and thus of the blade geometry viewed in cross section. The guide element, in particular the guide plate 15 is preferably integrally configured with the blade 7 in flow direction at the blade front side 23, so that no stalls occur, when the flow means transitions from the stator shell L to the turbine shell T. The configuration of the guide plate 15 viewed in circumferential direction can thus be configured, so that it contacts the next blade in circumferential direction, in particular so that it contacts the blade backside 24. However, also a smaller distance is conceivable.

Figure 3:
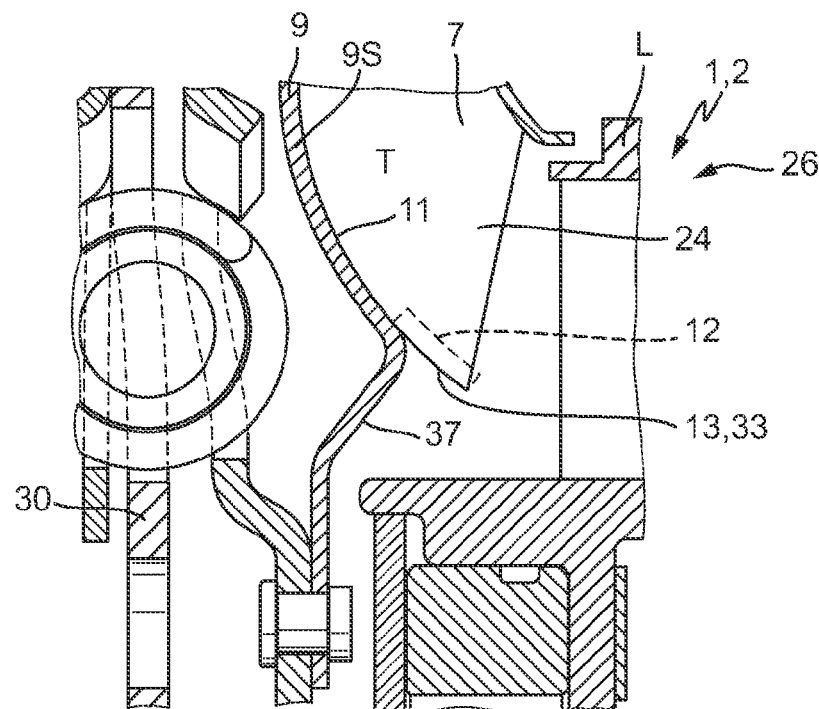
FIG. 3 shows the integration of the flow control means at the blade array according to a first embodiment in a force transmission device with reference to a detail of its axial sectional view.

FIG. 3 illustrates a configuration of the means 12 according to the FIGS. 2a and 2b with reference to a detail of an axial sectional view of the hydrodynamic component 1 in a connection situation in a force transmission device 26 in a view of the blade backside 24.

Figure 4:
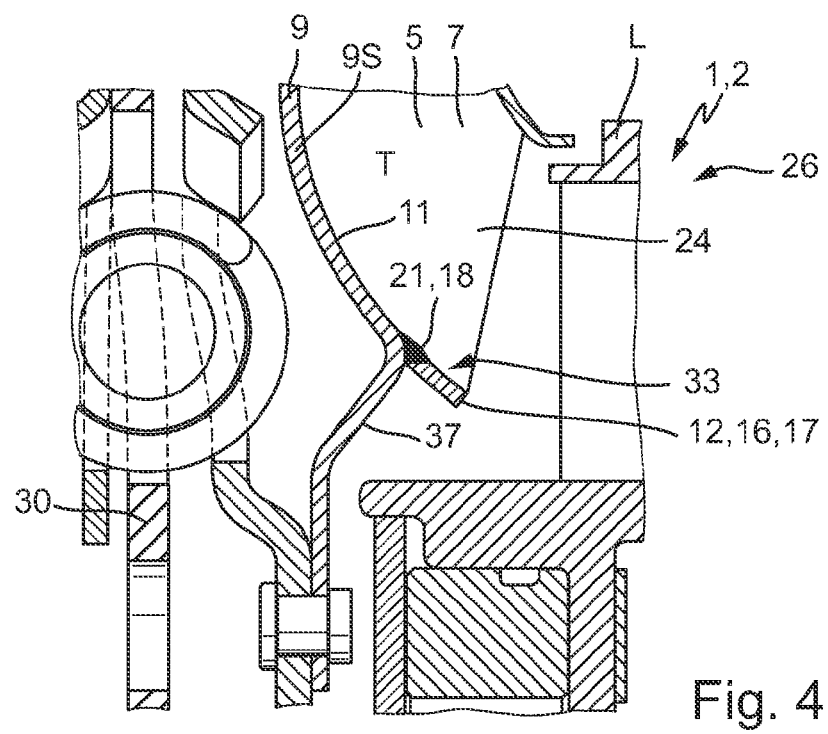
FIG. 4 illustrates an alternative embodiment of the flow control means in the form of a separate surface based guide element.
Figure 5:
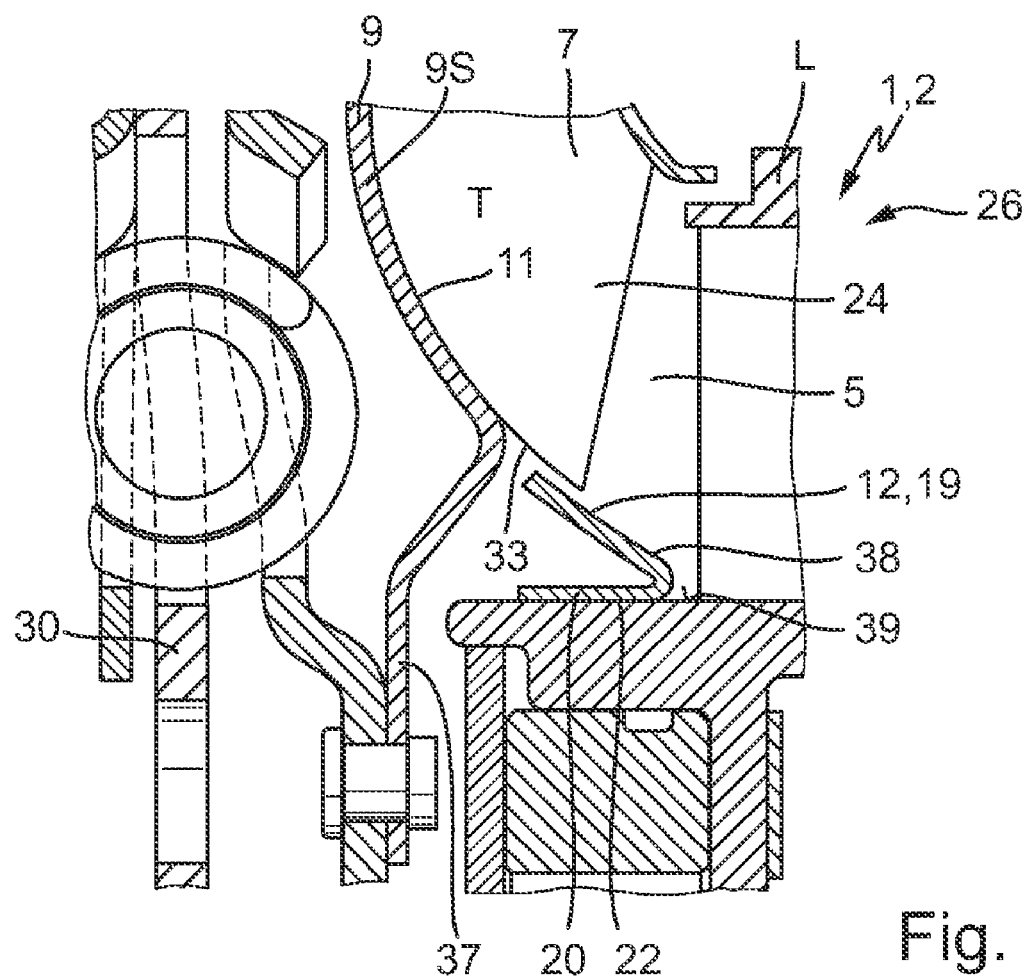
FIG. 5 illustrates another alternative embodiment of the flow control means.

On the other hand, the FIGS. 4 and 5 illustrate alternative solutions for the means 12 in the radially inner portion of the blade array of the turbine shell T, which is not supported by the turbine shell dish 9, in particular the portion of the radially inner blade ends 33. In said portion, the missing dish is reconstituted at the particular overhanging blades in the portion without support in radial direction by means 12 in the form of an annular element 16 connected torque proof and permanently with the turbine shell dish 9. This is either a plurality of ring segment shaped sheet metal elements disposed behind one another, extending in circumferential direction, or as illustrated in FIG. 4, preferably it is a completely annular sheet metal element 17, which can be adapted viewed in cross section with its outer circumference 18 to the surfaces defined by the particular protruding blade ends 33 in circumferential direction. The torque proof connection 21 is preferably performed through welding or soldering. This is provided in the portion of the blade base 9, and extends in circumferential direction. The annular sheet metal element 17 can thus be adapted to the base of the blade 10 in the overhanging portion 13 with respect to the geometry of the connection surface formed by the outer circumference 18, so that a press fit can be created. The permanent torque proof connection 21 is thus preferably performed when the particular blades 7 are mounted.

On the other hand, FIG. 5 illustrates a second alternative embodiment in which the means 12 are connected to the stator shell L torque proof. The means 12 are thus configured, so that they have no contact connection with the overhanging free blade ends 33. This is implemented by at least one additional sheet metal element 19, extending in circumferential direction and configured as an annular segment or preferably configured circumferential and ring shaped, which sheet metal element is connected torque proof to the stator shell L and disposed configuring a distance from the outer contour of the overhanging blade ends 33. The torque proof connection 20 can be provided in many configurations. Embodiments with bonding or form locking or friction locking are conceivable. The sheet metal geometry can also be provided in various configurations. In the simplest case, this is an annular form element, wherein the annular cross section describes substantially a V-shaped or C-shaped cross section profile. A first arm of the profile cross section describing the outer circumference of the ring shaped element 19, thus reconstitutes the contour of the radially inner blade end 33 of the particular blade 7 in the form of a guide surface 38 at a distance from the blade array. The second radially inner arm of the profile cross section describes the inner circumference of the annular element 19 and forms a support surface 22, which is supported at a support surface 39 of the stator shell L and which is connected therewith through a torque proof connection 20. The torque proof connection 20 can be implemented by a press fit or by connection elements or connection means.

The embodiments illustrated in FIGS. 1 through 5 constitute particularly advantageous solutions. The solution according to the invention, however, is not confined to said solutions. The solution according to the invention can furthermore be used for pump shells as well as for turbine shells, in particular in general for bladed shells, which are characterized by a dish, which is pot shaped, this means characterized by a strong local width contraction and/or direction change. The invention can be used for hydrodynamic speed-/torque converters and also for hydrodynamic clutches.

REFERENCE NUMERALS AND DESIGNATIONS 1 hydrodynamic component
2 hydrodynamic speed-/torque converter
3 output side component
4 input side component
5 operating cavity
6 blade
7 blade
8 pump shell dish
8S portion of blade array supported by pump shell dish
9 turbine shell dish
9S portion of blade array supported by turbine shell dish
10 blade base
11 blade base
12,12.6,12.7 flow cycle control means
13,13.6,13.7 portion
14 blade top
15 guide plate
16 annular element
17 sheet metal element
18 outer circumference
19 annular element
20 torque proof connection
21 torque proof connection
22 support surface
23 blade front side
24 blade back side
26 force transmission device
27 transmission input shaft
28 hub
29 shiftable clutch device
30 torsion vibration damper
31 housing
32,32.6,32.7 radially outer end portion
33,33.6,33.7 radially inner end portion
34 control portion
35 mounting means
36 means for coupling with connection element
37 pot shaped dish configuration
38 control surface
39 connection surface
$d_{AP}$ outer diameter of the operating cavity at the pump shell
$d_{AT}$ outer diameter of the torus shaped cavity at the turbine shell
$d_{IP}$ inner diameter of the torus shaped operating cavity at the pump shell
$d_{IT}$ inner diameter of the torus shaped operating cavity at the turbine shell
P pump shell
T turbine shell
L stator shell
R rotation axis
E inlet
A outlet
F force

The invention claimed is:

1. A hydrodynamic component (1), comprising at least two bladed shells (P, T, L) forming a torus shaped operating cavity (5) in combination, each comprising a dish (8, 9) which supports the particular blades (6, 7) over a portion (8S, 9S), wherein at least one of the bladed shells (P, T) comprises no support of the blades (6, 7) through the dish (8, 9) in the radially inner end portion (33, 33.6, 33.7) of the particular blades (6, 7), wherein flow control means (12, 12.6, 12.7) are associated with said radially inner end portion (33, 33.6, 33.7) of the particular blades (6, 7), which free end portion is not supported by the dish (8, 9);

wherein the flow control means (12, 12.6, 12.7) comprise at least one annular segment shaped or annular guide element (16), whose outer circumference (18) substantially defines the contour of the torus shaped operating cavity (5) in the portion (13, 13.6, 13.7) of the blade ends (33, 33.6, 33.7) without support, and which guide element is connected torque proof with the respective shell (8, 9) of the bladed shell (P, T).

2. A hydrodynamic component (1) according to claim 1, wherein the torque proof connection (21) is configured as a permanent torque proof connection.

3. A hydrodynamic component (1) according to claim 1, wherein the torque proof connection (21) is configured as a disengageable torque proof connection.

4. A hydrodynamic component (1), comprising at least two bladed shells (P, T, L) forming a torus shaped operating cavity (5) in combination, each comprising a dish (8, 9) which supports the particular blades (6, 7) over a portion (8S, 9S), wherein at least one of the bladed shells (P, T) comprises no support of the blades (6, 7) through the dish (8, 9) in the radially inner end portion (33, 33.6, 33.7) of the particular blades (6, 7), wherein flow control means (12, 12.6, 12.7) are associated with said radially inner end portion (33, 33.6, 33.7) of the particular blades (6, 7), which free end portion is not supported by the dish (8, 9);

wherein the flow control means (12, 12.6, 12.7) comprise a ring segment shaped or annular guide element (19), whose outer circumference substantially defines the contour of the torus shaped operating cavity (5) in the portion (13, 13.6, 13.7) of the blade ends (33, 33.6, 33.7) without support, and which guide element is disposed at a distance from the free blade ends (33, 33.6, 33.7) and connected torque proof to an adjacent stator shell (L).

5. A hydrodynamic component (1) according to claim 4, wherein the annular guide element (19) of the flow control means (12) is attached at the stator shell (L).

6. A hydrodynamic component (1), comprising at least two bladed shells (P, T, L) forming a torus shaped operating cavity (5) in combination, each comprising a dish (8, 9) which supports the particular blades (6, 7) over a portion (8S, 9S), wherein at least one of the bladed shells (P, T) comprises no support of the blades (6, 7) through the dish (8, 9) in the radially inner end portion (33, 33.6, 33.7) of the particular blades (6, 7), wherein flow control means (12, 12.6, 12.7) are associated with said radially inner end portion (33, 33.6, 33.7) of the particular blades (6, 7), which free end portion is not supported by the dish (8, 9);

wherein said component is configured as a hydrodynamic speed-/torque converter (2), comprising a pump shell (P) and turbine (T) and at least one stator shell (L) disposed there between.

* * * * *